United States Patent [19]

Mather

[11] Patent Number: 5,357,865
[45] Date of Patent: Oct. 25, 1994

[54] METHOD OF CLOUD SEEDING

[75] Inventor: Graeme K. Mather, Nelspruit, South Africa

[73] Assignee: Water Research Commission, Pretoria, South Africa

[21] Appl. No.: 840,007

[22] Filed: Feb. 21, 1992

[30] Foreign Application Priority Data

Feb. 22, 1991 [ZA] South Africa .................. 91/1324

[51] Int. Cl.$^5$ .................... A01G 15/00; F42B 4/04
[52] U.S. Cl. ............................ 102/361; 252/194; 239/2.1; 239/14.1
[58] Field of Search ........... 252/194, 319; 102/361; 239/2.1, 14.1

[56] References Cited

U.S. PATENT DOCUMENTS

| | | | |
|---|---|---|---|
| Re. 29,142 | 2/1977 | Papee et al. | 252/305 |
| 3,127,107 | 3/1964 | Merryweather | 239/2 |
| 3,441,214 | 4/1969 | D'Ayignon et al. | 239/2 |
| 3,587,966 | 6/1971 | Zettlemoyer et al. | 239/2 |
| 3,613,992 | 10/1971 | Knollenberg | 239/2 |
| 3,630,950 | 12/1971 | Papee et al. | 252/305 |
| 3,659,785 | 5/1972 | Nelson et al. | 239/2 R |
| 3,784,099 | 1/1974 | Bosco | 239/2 R |
| 3,785,557 | 1/1974 | Womack | 239/14 |
| 3,902,934 | 9/1975 | Timmerman | 149/83 |
| 3,940,059 | 2/1976 | Clark et al. | 239/2 R |
| 4,096,005 | 6/1978 | Slusher | 149/18 |
| 4,111,911 | 9/1978 | Garrison | 260/583 P |
| 4,141,274 | 2/1979 | Gerber | 89/1.5 R |
| 4,373,391 | 2/1983 | Johnson | 73/335 |
| 4,653,690 | 3/1987 | St. Amand et al. | 239/2.1 |

FOREIGN PATENT DOCUMENTS

| | | |
|---|---|---|
| 2137815 | 8/1973 | Denmark . |
| 2167266 | 1/1972 | France . |
| 2190353 | 2/1972 | France . |
| 2267696 | 11/1975 | France . |
| 2385075 | 3/1977 | France . |
| 2394979 | 1/1979 | France . |
| 2468300 | 4/1981 | France . |
| 1110768 | 3/1965 | United Kingdom ........... C10L 5/00 |

OTHER PUBLICATIONS

Hindeman, Edward E. II, "Water Droplet Fogs Formed From Pyrotechnically Generated Condensation Nuclei," *J. Wea. Modif.*, 10, 1978.
Chemical Abstracts, vol. 71, No. 93661v.
Chemical Abstracts, vol. 75, No. 53498y.
Chemical Abstracts, vol. 79, No. 8209b.
Chemical Abstracts, vol. 80, No. 98560g.
Chemical Abstracts, vol. 81, No. 52764u.
Chemical Abstracts, vol. 82, No. 173987u.
Chemical Abstracts, vol. 86, No. 109380a.
Chemical Abstracts, vol. 88, No. 91692h.
Chemical Abstracts, vol. 92, No. 61832u.
Chemical Abstracts, vol. 101, No. 155361w.

*Primary Examiner*—Peter A. Nelson
*Attorney, Agent, or Firm*—Richards, Medlock & Andrews

[57] ABSTRACT

A method of cloud seeding for precipitation enhancement comprises releasing hygroscopic seeding particles from a seeding flare 10. The particles are obtained by burning, in the flare, a pyrotechnic composition which includes, as an oxidizing agent, a compound selected from the group consisting in potassium chlorate and potassium perchlorate. The particles are allowed to enter a suitable cloud formation. The particles act as seeds or nuclei for precipitable water drop formation, thereby to enhance precipitation from the cloud formation.

20 Claims, 4 Drawing Sheets

LEGEND: VALUES ARE GIVEN IN dBz

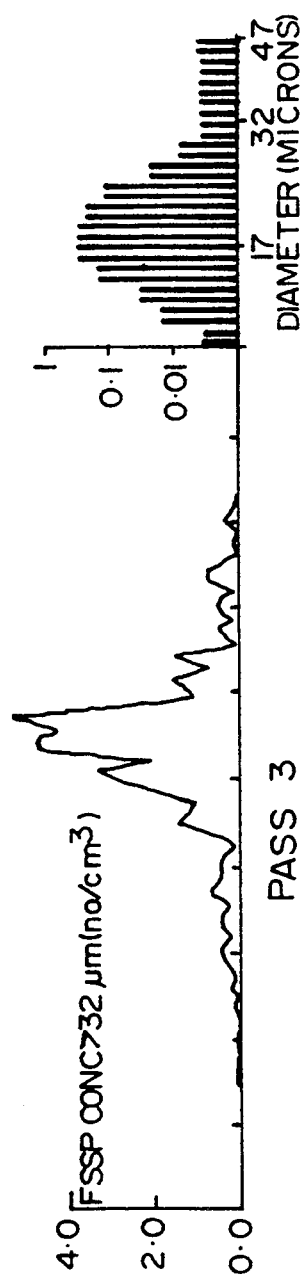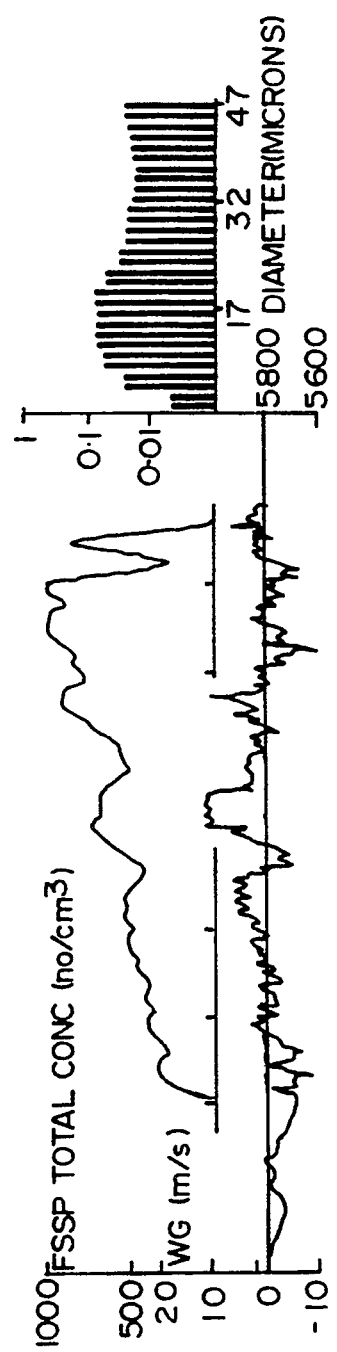

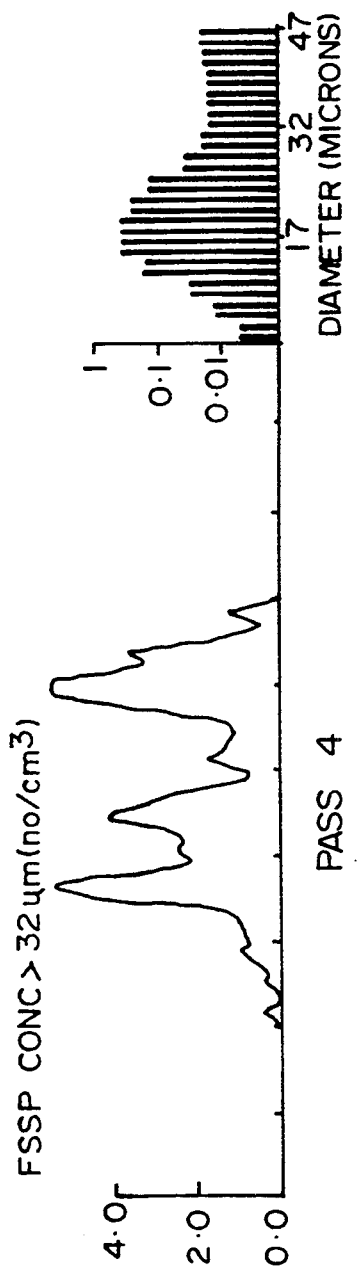
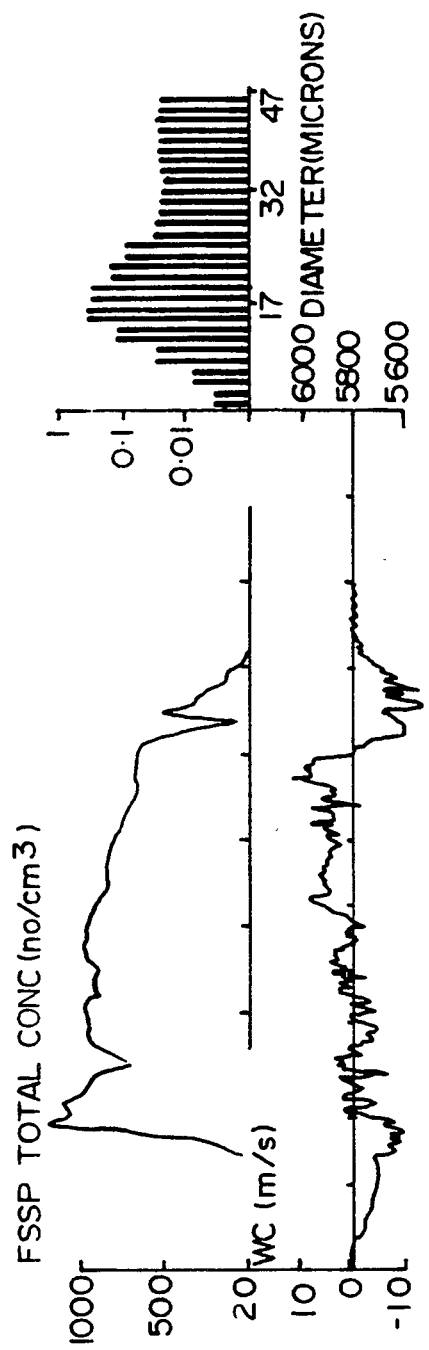
FIG 2E
FIG 2F

METHOD OF CLOUD SEEDING

THIS INVENTION relates to a method of cloud seeding. It relates in particular to a method of cloud seeding for precipitation enhancement.

According to the invention, there is provided a method of cloud seeding for precipitation enhancement, which method comprises burning, in a seeding flare, a pyrotechnic composition which includes, as an oxidizing agent, a compound selected from the group consisting of potassium chlorate ($KClO_3$) and potassium perchlorate ($KClO_4$), thereby to produce hygroscopic seeding particles, which are released from the seeding flare; and allowing these particles to enter a suitable cloud formation where they act as seeds or nuclei for precipitable water drop formation, thereby to enhance precipitation from the cloud formation.

While, in principle, the particles can be released from the seeding flare when it is located more-or-less at ground level, they are preferably released from the flare in proximity to the cloud formation. Typically they may be released immediately below the cloud formation from an aircraft traversing below the cloud formation, with the flare thus being mounted to the aircraft. A plurality of the seeding flares may be provided on the aircraft with the flares being mounted to external racks on the aircraft and being electrically initiated from inside the aircraft. The particles are thus released in the aircraft's wake.

The Applicant believes that rain or precipitation from the cloud formation is enhanced or augmented by means of a coalescence process in the cloud formation in which water droplets around the nuclei grow sufficiently large sufficiently quickly so that most of the available supercooled water in the cloud formation is collected into precipitable drops. Thus the hygroscopic particles enhance or promote the rate at which the water drops are formed.

The seeding particles may be of sub- and super-micron size, and all or the majority of particles may have a maximum particle size of 300 $\mu$m.

Potassium perchlorate is preferred as the oxidizing agent in view of its ready availability and relatively low cost. During the burning of the pyrotechnic formulation, the potassium perchlorate is reduced to potassium chloride (KCl) which forms at least part of the seeds or nuclei. Once precipitation has occurred, the seeds or nuclei are deposited on the ground, and the seeds or nuclei should thus, as regards their chemical composition, be as environmentally acceptable as possible. Potassium chloride is often used as a fertilizing component, and hence the potassium chloride present in the seeds or nuclei is environmentally acceptable.

The pyrotechnic or combustion formulation may also include an oxidizable substance, such as magnesium (Mg). It may also include a hygroscopic substance which is substantially unaffected by the combustion of the formulation, such as sodium chloride (NaCl).

The pyrotechnic or combustion formulation may thus be such that the seeding particles comprise KCl, NaCl, and MgO. The pyrotechnic formulation may also include other components such as binders and additives. The formulation may thus comprise a hydrocarbon binder, magnesium, sodium chloride, potassium perchlorate and lithium carbonate. For example, it may comprise (by mass) 18% hydrocarbon binder, 5% Mg, 10% NaCl, 65% $KClO_4$ and 2% $Li_2CO_3$. The pyrotechnic formulation is characterized by the absence therein of silver iodide, urea, and solid carbon dioxide.

In one embodiment of the invention, the flares may comprise a cardboard container about 12 cm long and 7 cm in diameter, and containing about 450 grams of the composition. These flares have a linear burning rate of about 0.66 mm $s^{-1}$, giving a burning time of about 3 minutes, during which time about $9.6 \times 10^{12}$ particles per gram of formulation, are released, with the particles having a mean diameter of about 2 $\mu$m. In another embodiment of the invention, the flares may have a diameter of about 7 cm, a length of about 30 cm, and a formulation mass of between 950 and 1000 grams.

The invention will now be described in more detail with reference to the following non-limiting example, as well as the attached graphs and drawing in which FIG. 1 shows a longitudinal sectional view of a pyrotechnic seeding flare for use in the method of the invention for cloud seeding;

FIG. 2C is a graph showing a time history of FSSP concentrations of droplets greater than 32 microns in diameter and the distribution of particle diameters during a third pass through the cloud seeded during the trial;

FIG. 2D is a graph showing a time history of FSSP concentrations of total droplets, the vertical velocity, and the distribution of particle diameters during the third pass through the cloud seeded during the trial;

FIG. 2E is a graph showing a time history of FSSP concentrations of droplets greater than 32 microns in diameter and the distribution of particle diameters during a fourth pass through the cloud seeded during the trial;

FIG. 2F is a graph showing a time history of FSSP concentrations of total droplets, the vertical velocity, and the distribution of particle diameters during the fourth pass through the cloud seeded during the trial;

Figure 1:
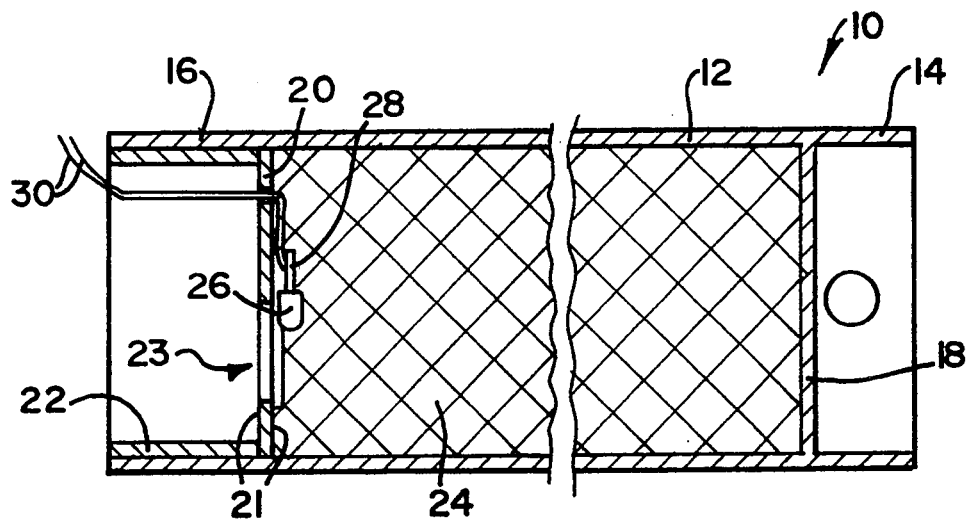

Referring to FIG. 1, reference numeral 10 generally indicates a pyrotechnic seeding flare which can be used in the method of cloud seeding for precipitation enhancement, according to the invention.

The flare 10 comprises a non-reusable tubular body 12 of rolled assembly or construction. The body 12 has ends 14 and 16. An adhesively secured closure disc 18 closes off the end 14 of the body, while a closure disc 20, lined with layers of foil 21, closes off its other end. An aperture 23, initially covered by the foil layers 21, is provided in the disc 20. An adhesively secured sleeve 22, of ring-rolled construction, locates the disc 20 in position.

The assembly 12 is filled with a pyrotechnic formulation 24 comprising 18% hydrocarbon binder, 5% Mg, 10% NaCl, 65% $KClO_4$ and 2% $Li_2CO_3$.

A fuse head 26 is mounted against the disc 20, and a cambric strip 28 is located against the fuse head. Electrical wires 30, for actuating the fuse head remotely from an aircraft to which the flare is mounted, lead from the fuse head through the disc 20.

Typically, the flare 10 is about 27 cm long, has a nominal diameter of about 6.5 cm and has a formulation mass of about 950 gm. The flare then has a static burn time of about 4 minutes.

The flare 10 fits into external racks provided on the aircraft, and is electrically initiated from inside the aircraft, by using the aircraft's power supply, which is typically 28 V. It is capable of withstanding vibrations emitted by a turbo prop or turbojet aircraft, whether enginemounted or wingmounted, and is also capable of withstanding impacts equivalent to a drop of 1.5 m onto a hard surface. It is capable of functioning after having been subjected to temperatures as low as $-20°$ C., and has a shelflife of about 3 years.

Flares 10 were used in a technical trial to seed a cloud formation in accordance with the method of the invention.

TECHNICAL TRIAL

In a confidential technical trial which was conducted on a small isolated cloud formation above the Nelspruit area in the Transvaal Province of the Republic of South Africa, two flares 10 as described above with reference to FIG. 1, mounted externally on an Aero Commander aircraft, were ignited electrically from inside the aircraft at the cloud base at 15h56. An observational system comprising a Learjet and a 5 cm radar in volume scan mode was used. The Learjet commenced (first pass) sampling cloud turrets rising on the northwestern flank of this storm cloud formation, at 15h54. Updraft speed was measured at 8.2 m/s. The second pass was made at 15h58, and an updraft speed of 9.4 m/s was measured. The Learjet first encountered a seeded plume at 16h02, i.e. 6 minutes after the seeding had commenced, as indicated in Table 1 hereunder, and as illustrated graphically in FIG. 2.

The Commander aircraft seeded at a height of about 3000 m, while the Learjet sampled at 5900 m, giving an altitude difference of 2900 m. To reach the altitude of the Learjet in the available 6 minutes, the seeding material must have travelled vertically at a speed of 8 m/s, which is close to the observed updraft speeds.

Third, fourth, and fifth passes were conducted at 16h02, 16h06 and 16h10 respectively.

TABLE 1

Comparison of 1 km averages of FSSP measurements of droplets around the maximum liquid water content ('LWC') and the maximum updraft speed

| | Pass | | | | |
|---|---|---|---|---|---|
| | 1 | 2 | 3 | 4 | 5 |
| | Time: | | | | |
| | 15:54 | 15:58 | 16:02 | 16:06 | 16:10 |
| 1 km averages around Max. FSSP LWC | | | | | |
| droplet concentration ($cm^{-3}$) | 470 | 589 | 808 | 965 | 595 |
| droplet concentration >32 $\mu$m ($cm^{-3}$) | 0.20 | .20 | 0.70 | 3.00 | 1.13 |
| LWC ($g/m^3$) | 0.92 | 1.00 | 1.26 | 1.63 | 1.00 |
| mean diameter ($\mu$m) | 13.20 | 12.30 | 11.90 | 12.00 | 12.30 |
| MW mean diameter ($\mu$m) | 19.10 | 18.40 | 18.40 | 19.50 | 18.70 |
| Dispersion | 0.47 | 0.49 | 0.50 | 0.53 | 0.49 |
| 1 km averages around Max. updraft speed | | | | | |
| droplet concentration ($cm^{-3}$) | 413 | 393 | 649 | 703 | 391 |
| droplet concentration >32 $\mu$m ($cm^{-3}$) | 0.39 | 0.55 | 3.68 | 3.77 | 0.57 |
| LWC ($g/m^3$) | 0.76 | 0.77 | 0.57 | 1.22 | 0.58 |
| mean diameter ($\mu$m) | 12.70 | 12.60 | 8.50 | 12.20 | 11.60 |
| MW mean diameter ($\mu$m) | 19.00 | 19.90 | 21.80 | 19.90 | 18.20 |
| Dispersion | 0.48 | 0.53 | 0.64 | 0.51 | 0.51 |

Legend: MW = Mass Weighted

Figure 2A:
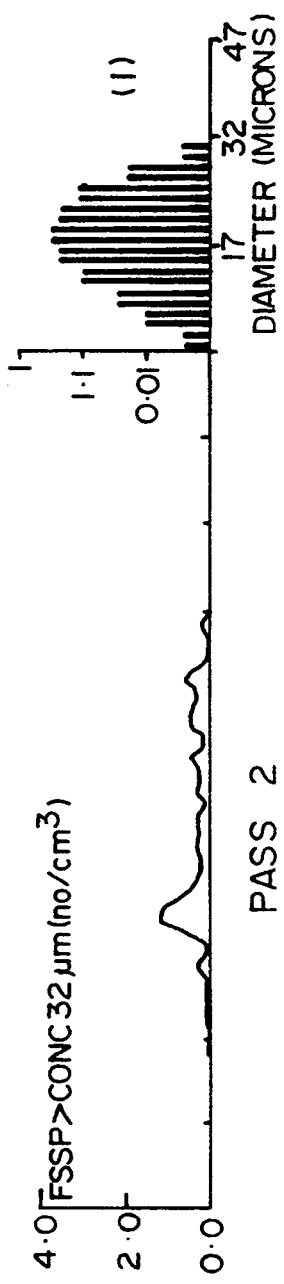
FIG. 2A is a graph showing a time history of FSSP ("Forward Scattering Spectrometer measurements of small droplets in clouds") concentrations of droplets greater than 32 microns in diameter and the distribution of particle diameters during a second pass through a cloud seeded during a trial in accordance with the method of the invention, using flares in accordance with FIG. 1.
Figure 2B:
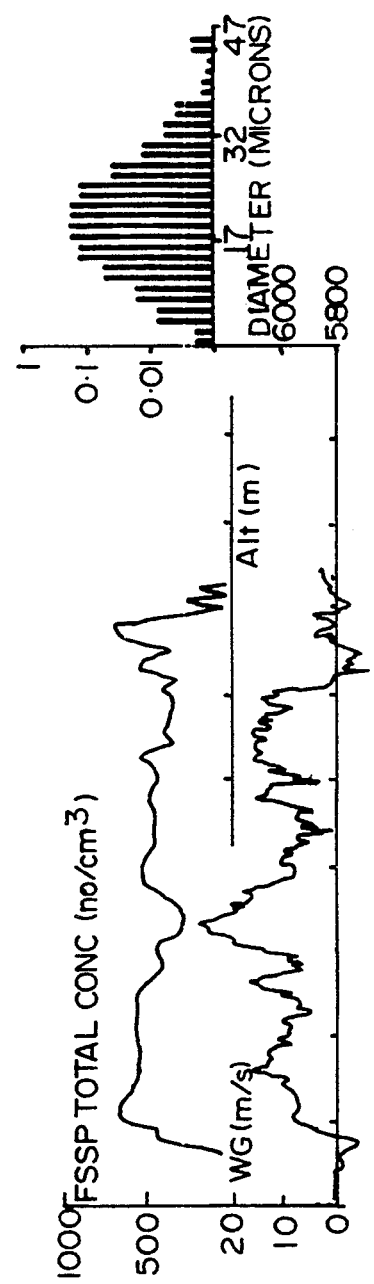
FIG. 2B is a graph showing a time history of FSSP concentrations of total droplets, the vertical velocity, and the distribution of particle diameters during the second pass through the cloud seeded during the trial.

From FIG. 2, it will be noted that there is a substantial difference in FSSP measurements between passes 2 and 3, the differences being most pronounced in the 1 km averages around the updraft maxima. The number of drops with diameters greater than 32 microns increases almost seven fold from 0.55 to 3.68 $cm^{-3}$. The mean particle diameter decreased, but the mass-weighted mean diameter increased, as shown in Table 1.

In FIG. 2, the time histories of FSSP concentrations and updraft profiles for passes 2 to 4 are thus portrayed. The first spectrum (1) in each pass shows the size distributions of the water mass up to the probe size limit of 47 microns. The second spectrum (2) in each pass is the 1 km average around the updraft maximum. It is this spectrum that changes radically from pass 2 to pass 3. The updraft peak coincides with the peak in concentrations greater than 32 microns confirming that the updraft is carrying the seeding material. By 16h06, the seeding material was well spread throughout the cloud formation since the mass density spectra around the liquid water and updraft maxima look similar. Concentrations had by then almost doubled as revealed in Table 1, and computed liquid water content peaked on the fourth pass which took place at 16h06. By 16h10 the values in Table 1 have fallen back to the pre-treatment levels.

Figure 3:
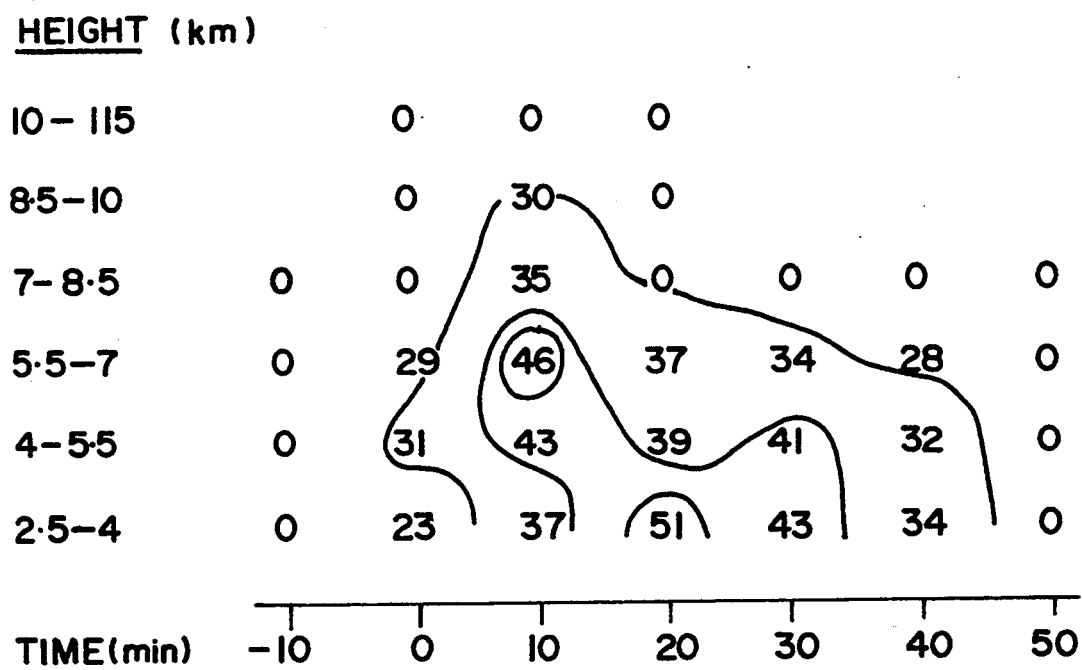
FIG. 3 shows a plot of height versus time during the cloud seeding trial.

Aircraft tracks and returns from the target storm cloud formation were recorded by the 5 cm radar, operating in volume scan mode. Objective storm tracking software was used to process the raw radar data so that the storm could be described or characterized in terms of its track properties. In this regard, time/height plots of peak equivalent reflectivities are a convenient way of presenting the storm time history, as indicated in FIG. 3. The trajectory of the seeding material, released at time 0, arcs up into the cloud to produce a maximum aloft (46 dBz at time+10 minutes), with the downward cascade of the growing precipitation particles reaching the ground at t+20 minutes (51 dBz).

This confidential technical trial thus clearly shows that seeding-induced acceleration of the coalescence process, in accordance with the method of the present invention, led to the early development of large precipitation particles in a cloud that might not have produced rain, had no seeding been done (the cloud was not raining before seeding and stopped raining some 40 minutes after seeding).

The composition and sizes of the particles released on combustion of the flares used in the abovementioned technical trial, were also determined, and are set out in Tables 2, 3 and 4 hereunder:

TABLE 2

X-RAY DIFFRACTION ANALYSES - QUALITATIVE RESULTS[1]

| Pyrotechnic Mixture - unburnt[2] | Potassium perchlorate | $KClO_4$ |
| | Sodium chloride | NaCl |
| | Magnesium | Mg |
| Flammability Index Apparatus - residue[3] | Potassium perchlorate | $KClO_4$ |
| | Halite (sodium chloride) | NaCl |
| | Magnesium | Mg |
| Bomb Calorimeter - residue[3] | Potassium chloride | KCl |
| | Sodium chloride | NaCl |
| | Magnesium oxide | MgO |
| Wind Tunel - residue[3] | Potassium chloride | KCl |
| | Sodium chloride | NaCl |
| | Magnesium oxide | MgO |

[1]Non-crystalline component not detectable.
[2]$LiCO_3$ not detected
[3]$Li_2O$, $LiCO_3$ and LiOH not detected.

TABLE 3

RELATIVE HUMIDITIES DURING WIND TUNNEL TESTS[1]

| | C | | % | C |
| --- | --- | --- | --- | --- |
| | Dry Bulk T | Wet Bulk T | Relative Humidity[2] | Dew Point[2] |
| XRD[3] sample | 21.4 | 16.7 | 62 | 13.9 |
| SEM[4] sample | 24.0 | 16.7 | 47 | 12.0 |
| PSD[5] sample | 22.0 | 14.4 | 42 | 8.6 |

[1]Measured at Johannesburg, South Africa altitude.
[2]Extracted from - Hygrometric Tables (860 mbar), Department of Transport - Weather Bureau, Republic of South Africa.
[3]XRD = X-ray Diffraction.
[4]SEM = Scanning Electron Microscope.
[5]PSD = Particle Size Determination.

TABLE 4

SCANNING ELECTRON MICROSCOPE - QUANTITATIVE RESULTS

PARTICLE IDENTITY

| | A (majority) | B (large, black)[3] | C (large, round) |
| --- | --- | --- | --- |
| % m/m | | | |
| NaCl | 21.2 | 24.5 | 13.1 |
| KCl | 67.0 | 52.6 | 86.9 |
| MgO | 11.8 | 22.9 | 0 |
| Abundance (%) | 95% | 5% | Trace |
| Photographic size (microns) approximate | 0.2–0.6[1] | 100–180[2] | 52[2] |

[1]Estimate of individual particle size, although material occurred mainly as agglomerates of much larger relative size.
[2]Discrete particles.
[3]Concentration of C and O indicating hydrocarbon binder.

Hygroscopic seeding in accordance with the method of the present invention has substantial advantages over glaciogenic seeding, e.g. seeding with silver iodide, such as

- hygroscopic seeding effects commence already at the cloud base, in contrast to glaciogenic seeding effects which only commence at at least the $-3°$ to $-5°$ C. level in the cloud
- from studyies conducted to date, Applicant believes that there is no risk of overseeding, which results in reduced rainfall, with hygroscopic seeding
- precipitation enhancement appears to be greater with hygroscopic seeding than with glaciogenic seeding
- effective glaciogenic seeding requires the seeding agent (silver iodide or dry ice) to be released above the cloud formation, which requires the use of high performance aircraft; hygroscopic seeding in accordance with the present invention is effected at the cloud base, which can be effected from less costly aircraft having lower operating costs
- glaciogenic seeding using silver iodate is more costly than hygroscopic seeding in accordance with the invention as a result of the silver content and the high purity requirement of the silver iodate in question
- hygroscopic seeding by means of flares in accordance with the present invention also avoids delivery problems such as caking of materials, clogging of delivery systems, and corrosion.

Hygroscopic seeding in accordance with the present invention will also, Applicant believes, suppress growth of large hail particles, in addition to augmenting rainfall. It is believed that this is as a result of the large water drops created by the hygroscopic seeds consuming the supercooled water in the cloud before it can reach the level of the hail formation region of the cloud. This effect is visible on radar profiles of seeded storms, which show a suppression of the height of the 45 dBz contour, which is a hail indicator, in storms which have been seeded in accordance with the method of the present invention.

I claim:

1. A method of cloud seeding for precipitation enhancement, which method comprises the steps of:
   - burning, in a seeding flare, a pyrotechnic formulation which includes lithium carbonate ($Li_2CO_3$) and, as an oxidizing agent, at least one compound selected from the group consisting of potassium chlorate ($KClO_3$) and potassium perchlorate ($KClO_4$), to produce hygroscopic seeding particles, which are released from said seeding flare; and
   - allowing said hygroscopic seeding particles to enter a suitable cloud formation wherein said hygroscopic seeding particles act as nuclei for precipitable water drop formation, thereby enhancing precipitation from said cloud formation.

2. A method according to claim 1, wherein the pyrotechnic formulation also includes a hydrocarbon binder, magnesium (Mg) and sodium chloride (NaCl).

3. A method according to claim 2, wherein the pyrotechnic formulation comprises (by mass) about 18% hydrocarbon binder, about 5% Mg, about 10% NaCl, about 2% $Li_2CO_3$, and about 65% of said oxidizing agent.

4. A method according to claim 1, wherein said pyrotechnic formulation is such that said hygroscopic seeding particles comprise KCl and NaCl.

5. A method according to claim 4, wherein said hygroscopic seeding particles comprise from about 52.5 to about 86.9 mass percent KCl, and from about 13.1 to about 21.2 mass percent NaCl.

6. A method according to claim 1, wherein the hygroscopic seeding particles have a spread of sizes ranging from sub-micron to super-micron size, with a major porportion of said hygroscopic seeding particles having a maximum particle size of less than 300 microns.

7. A method according to claim 6, wherein the sizes of the hygroscopic seeding particles range from 0.2 micron to 180 microns.

8. A method according to claim 1, wherein the burning of the pyrotechnic formulation and the release of said hygroscopic seeding particles are effected immediately below said cloud formation from an aircraft traversing below the cloud formation, with said seeding flare being mounted to said aircraft.

9. A method according to claim 8, wherein a plurality of the seeding flares are mounted to external racks on said aircraft and are electrically initiated from inside said aircraft, said hygroscopic seeding particles thus being released in the wake of said aircraft.

10. A method of cloud seeding for precipitation enhancement, which method comprises the steps of:

burning, in a seeding flare, a pyrotechnic formulation to produce hygroscopic seeding particles which are released from said seeding flare, said hygroscopic seeding particles comprising from about 52.6 to about 86.9 mass percent KCl, and from about 13.1 to about 21.2 mass percent NaCl; and causing said hygroscopic seeding particles to enter a suitable cloud formation wherein said hygroscopic seeding particles act as nuclei for precipitable water drop formation, thereby enhancing precipitation from said cloud formation.

11. A method according to claim 10, wherein the hygroscopic seeding particles have a spread of sizes ranging from sub-micron to super-micron size, with a major proportion of said hygroscopic seeding particles having a maximum particle size of less than 300 microns.

12. A method according to claim 11, wherein the sizes of the hygroscopic seeding particles range from 0.2 micron to 180 microns.

13. A method according to claim 10, wherein the burning of the pyrotechnic formulation and the release of said hygroscopic seeding particles are effected immediately below said cloud formation from an aircraft traversing below the cloud formation, with said seeding flare being mounted to said aircraft.

14. A method according to claim 13, wherein a plurality of the seeding flares are mounted to external racks on said aircraft and are electrically initiated from inside said aircraft, said hygroscopic seeding particles thus being released in the wake of said aircraft.

15. A method of cloud seeding for precipitation enhancement, which method comprises the steps of:

burning, in a seeding flare, a pyrotechnic formulation to produce hygroscopic seeding particles which are released from said seeding flare, said hygroscopic seeding particles ranging in size from sub-micron to super-micron size, with a major proportion of said hygroscopic seeding particles having a maximum particle size of less than about 300 microns; and allowing said hygroscopic seeding particles to enter a suitable cloud formation wherein said hygroscopic seeding particles act as nuclei for precipitable water drop formation, thereby enhancing precipitation from said cloud formation.

16. A method according to claim 15, wherein the seeding particles range in size from 0.2 micron to 180 microns.

17. A method according to claim 15, wherein the burning of the pyrotechnic formulation and the release of said hygroscopic seeding particles are effected immediately below said cloud formation from an aircraft traversing below the cloud formation, with said seeding flare being mounted to said aircraft.

18. A method according to claim 17, wherein a plurality of seeding flares are mounted to external racks on said aircraft and are electrically initiated from inside said aircraft, said hygroscopic seeding particles thus being released in the wake of said aircraft.

19. A method according to claim 15, wherein said pyrotechnic formulation comprises, as an oxidizing agent, at least one compound selected from the group consisting of potassium chlorate ($KClO_3$) and potassium perchlorate ($KClO_4$).

20. A method according to claim 19, wherein said pyrotechnic formulation comprises, in addition to the oxidizing agent, a hydrocarbon binder, magnesium (Mg), sodium chloride (NaCl) and lithium carbonate ($Li_2CO_3$).

* * * * *